June 20, 1961 R. R. DAHL 2,989,086
SOLID FLOW CONTROL VALVE
Original Filed Feb. 26, 1954

Inventor
ROBERT R. DAHL
by Hill, Sherman, Meroni, Gross & Simpson Attys.

United States Patent Office 2,989,086
Patented June 20, 1961

2,989,086
SOLID FLOW CONTROL VALVE
Robert R. Dahl, Chicago, Ill., assignor to The Dole Valve Company, Chicago, Ill., a corporation of Illinois
Continuation of application Ser. No. 412,752, Feb. 26, 1954. This application Feb. 27, 1958, Ser. No. 718,941
5 Claims. (Cl. 138—43)

This invention relates to improvements in flow control devices for maintaining a substantially constant rate of fluid flow over a wide range of pressure variations.

This application is a continuation application for my application Serial No. 412,752 filed February 26, 1954, now abandoned.

A principal object of my invention is to provide a simple and improved form of resilient flow control device for controlling the flow of fluid through a passageway in which the flow control characteristics are in the device itself.

Another object of my invention is to provide an improved form of flow control device in which the flow control is obtained by a disk abutting the shoulder of a passageway in which the disk is recessed on its downstream side and accommodates the flow of fluid along the edge of the disk into the recessed portion thereof, and the constant flow rate is attained by flexing of the disk inwardly or outwardly along the shoulder of the passageway to reduce the flow area to the central recessed portion of the disk.

Another object of my invention is to provide a more efficient form of resilient flow control member than formerly, providing a uniform flow rate throughout a wide range of pressure variations, in which the control of the flow of fluid is by a resilient disk flexing inwardly or outwardly along a shouldered seat for the disk, upon pressure variations and in which the flow control characteristics are incorporated in the disk rather than the shouldered passageway therefor.

A further object of my invention is to provide a novel and improved form of resilient flow control disk in which the disk is seated against the plane shoulder of a passageway and the control of the flow of fluid is attained by the restriction of the flow of fluid between the disk and shoulder upon increases in pressure on the disk.

A still further object of my invention is to provide a more efficient and simpler form of resilient flow control member particularly arranged to reduce noise generation and having a plane flat surface on the upstream side thereof, and accommodating the passage of fluid along the edge thereof, and contoured on the downstream face thereof to divert the water stream and direct it to the outlet passageway and effect a constant delivery rate past the downstream side of the disk for a wide range of pressure variations.

Still another object of my invention is to provide a more flexible and accurate flow control member than formerly, wherein the flow control member is in the form of a flat disk having passageways leading along the edge and downstream face thereof to a contoured downstream face in the general form of the frustum of a cone having an inverted cone-like water diverting central portion, and in which the passageways leading to the contoured portion thereof control the flow by reduction in cross-sectional area upon flexure of the disk in a downstream direction along a shoulder of the water passageway upon increases in pressure on the upstream face thereof.

These and other objects of my invention will appear from time to time as the following specification proceeds and with reference to the accompanying drawings wherein.

Figure 1:
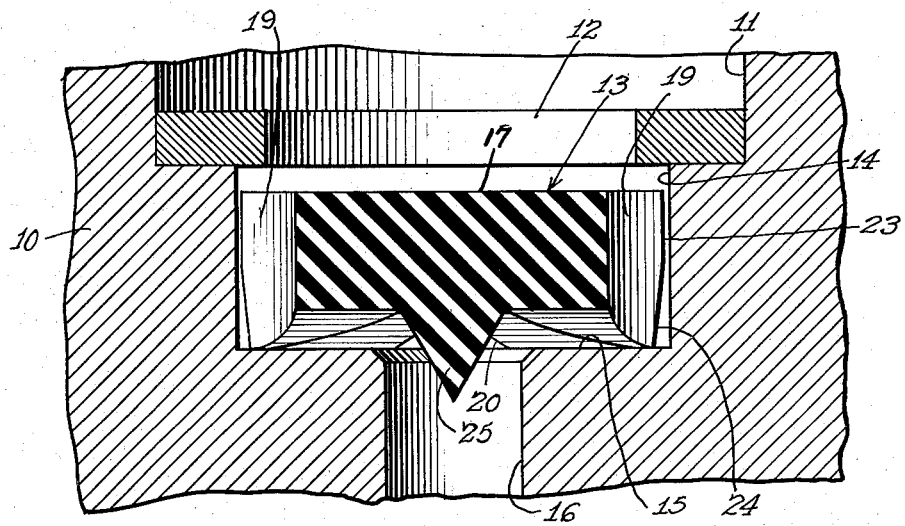
FIGURE 1 is a cross-sectional view taken through a fluid flow passageway, showing a flow control member constructed in accordance with my invention in the passageway, with no fluid pressure on the flow control member.
Figure 2:
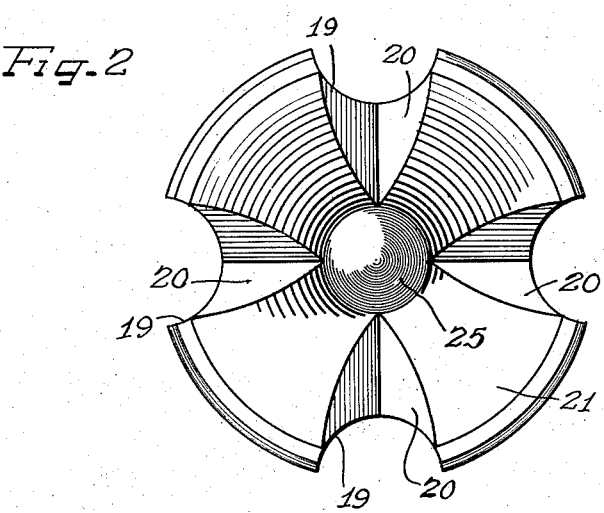
FIGURE 2 is a plan view of the flow control member looking toward the downstream face thereof.
Figure 3:
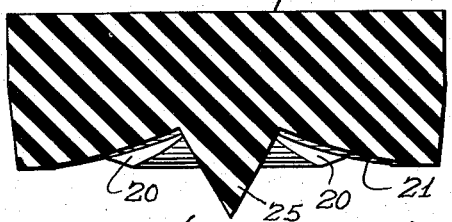
FIGURE 3 is a transverse sectional view taken through the flow control member.

In the embodiment of my invention illustrated in the drawing, I have shown a portion of a casing 10, which may be a valve body, a conduit or the like. The casing 10 is shown as having an enlarged diameter passageway 11 leading thereinto having a shoulder therein against which is seated a retaining ring 12 for a flow control member or disk 13. The flow control member 13 is seated in a reduced diameter passageway 14 against a flat plane shoulder 15. The shoulder 15 is shown as terminating at its inner margins into a reduced diameter axially aligned passageway 16 forming a discharge passage, which may be connected with a valve, a fluid delivery pipe or the like.

The shoulder 15 is shown as being relatively wide and as forming a flat seat for the flow control member or disk 13 to accommodate flexure of said member toward and from said shoulder upon variations in pressure on the upstream side of said member. The retaining ring 12 may be a snap ring and may be snapped into position in the inlet passageway 11, to retain the flow control member to the shouldered seat 15. The retaining ring 12 is shown as being spaced from the shoulder 15 so as to retain said flow control member within the passageway 14 and to accommodate freedom of movement of said flow control member within said passageway.

The flow control member 13 is shown as being in the form of a disk having a flat face 17 on the upstream side thereof and having an outer wall 23 spaced inwardly from the wall of the passageway 14 for the flow of fluid thereby. The flow control member also has axial flow passageways 19, 19 recessed within and opening to the outer wall 23 thereof. The axial flow passageways communicate with deformable flow restricting passageways 20, 20 recessed within the downstream face thereof and spaced radially outwardly from the center of the flow control member and opening to a contoured downstream face 21 of said flow control disk. The deformable passageways 20, 20 are herein shown as being radial, but need not be radial and may be arranged in various desired manners to attain the required control of the flow of fluid. The axial flow passageways also may or may not be used depending upon the volume of fluid to be controlled and the spacing of the wall of the flow control member from the wall of the passageway 14.

The flow control member 13 may be made from a resilient or elastic material, such as rubber or one of the well known substitutes for rubber, such as an elastomer or the like, so as to be readily flexible in a downstream direction inwardly along the shouldered seat 15 upon increases in pressure of the fluid acting thereon and so as to move back to its normal unstressed position shown in FIGURE 1 upon predetermined decreases in the pressure of fluid acting thereon.

The flow control member 13 is shown as including the outer wall 23 through which the axial passageways 19, 19 open, which fits within and is spaced inwardly from the passageway 14 and has an inwardly tapered lower portion 24, tapering inwardly to provide sufficient clearance between the flow control member and the wall of the passageway 14 to accommodate outward flexing of the tapered portion 24 of the flow control member 13 upon increases in pressure acting on the upstream face of said flow control member.

The deformable flow restricting passageways 20, 20 leading from the axial passageways 19, 19 are shown as being generally triangular in cross section although they need not be of such a cross-section and may be of other suitable cross sections. The deformable passageways 20, 20 terminate at the contoured face 21 and a central water diverting inverted cone-like projection 25, forms the inner margin of the contoured face 21. The contoured face 21 is shown as being in the general form of the frustum of a cone, recessed inwardly from the shouldered seat 15 adjacent the outer margin of the disk 13 and terminating at the base of the cone-like projection 25.

The inverted cone-like projection 25 serves to divert the water stream and direct it into the outlet passage 16, and in doing this reduces the noise generation heretofore present in flow control devices. The base of the projection 25 is of a lesser diameter than the diameter of the outlet 16, so as not to close off or unduly restrict the outlet orifice defined by the inner margin of the shoulder 15.

As the pressure of fluid acts on the upstream face of the flow control disk 13, there will be a pressure drop across the flow control passages 20. This will result in a pressure differential across the flow control disk 13. The pressure on the downstream side of the disk 13 being less than that on the upstream side thereof, and the disk 13 being of less cross-sectional area adjacent its center than at its edge and uniformly curving inwardly from its edge, will bend radially and the deformation of said disk will progress inwardly along the shoulder 15 from the periphery of said disk. The recessed contoured face 21 of the flow control disk 13 will thus progressively move from the outer margin of the shoulder 15 toward the orifice 16, into engagement with the plane face of the shoulder 15. At the same time the tapered outer wall 24 of the flow control member will flex outwardly toward the wall of the passageway 14. This flexing of the disk 13 in a downstream direction into engagement with the shoulder 15 will move the edges of the passageways 20, 20 downwardly and inwardly along the shoulder 15 and decrease the cross-sectional area thereof.

The passageways 20, 20 being of a reducing cross-sectional area as they extend toward the center of the disk 20, due to the concave form of said disk, the flow of fluid through the passageways 20, 20 as the pressure acting on the upstream face of the disk 13 increases, the increasing pressure will progressively reduce the flow area of said passageways as the concave face 21 is deflected into engagement with the shoulder 15 and as the deflection progresses radially inwardly along said shoulder, so as to provide a substantially constant flow of fluid through the discharge passageway 16 regardless of variations in pressure of the fluid at the source.

It should here be observed that the central base of the inverted cone-like projection 25, into which the apices of the passageways 20, 20 terminate, is spaced a substantial distance inwardly from the shoulder 15 and directs the fluid to the outlet 16 and by so directing the fluid reduces noise generation, and that the base of the projection 25 being of a smaller diameter than the diameter of the discharge passageway 16, the flow of fluid through said discharge passageway is never unduly restricted upon excessive pressure conditions.

It will be understood that variations and modifications of the present invention may be effected without departing from the spirit and scope of the novel concepts thereof.

I claim as my invention:

1. A fluid flow control device for maintaining a substantially uniform delivery rate over a wide range of pressure variations comprising a casing having a passageway leading therethrough, a relatively large area flat shoulder in said passageway facing the upstream side thereof, the inner margin of which defines an outlet orifice, a resilient disk in said passageway and seating against said shoulder, said disk having an outer wall closely spaced with respect to the wall of said passageway and having a plurality of equally spaced axial passageways leading therealong and opening to the periphery thereof, said disk having a flat face on the upstream side thereof and having a generally frusto-conical recessed face facing said shoulder, affording radial bending of said disk upon increases in pressure on the upstream face thereof and accommodating deformation of said disk inwardly along said shoulder from its periphery, said recessed face terminating in an inverted cone-like projection, the base of which is spaced from said shoulder, said disk also having flow restricting passageways leading from said axial passageways in the outer wall thereof along the frusto-conical recessed face thereof to said inverted cone-like projection and progressively decreasing in cross-sectional area from the edge toward the center of said disk, whereby said flow restricting passageways decrease in flow area upon movement of said frusto-conical face inwardly along said shoulder and said cone-like projection directs fluid to flow through the outlet passageway and reduces noise generation.

2. A fluid flow control device for maintaining a substantially uniform fluid delivery rate over a wide range of pressure variations comprising a casing having a relatively large diameter inlet, a reduced diameter outlet in axial alignment with said inlet and a shoulder at the junction of said inlet and said outlet having a relatively wide annular bearing area, a resilient flow control disk mounted in said inlet and in substantial engagement with the wall thereof and seated against said shoulder by the pressure of fluid acting thereon, said flow control disk having a flat face on its upstream side and having a recessed face on its downstream side in the general form of the frustum of a cone, affording radial bending of said flow control disk inwardly along said shoulder from the edge of said disk upon increases in pressure on the upstream side thereof, said flow control disk also having an axial passageway opening to the wall thereof and having a flow restricting passageway leading from said axial passageway along the recessed face of said flow control disk and decreasing in cross-sectional area from the edge toward the center of said disk and reducing in flow area upon the progressive deformation of said recessed face inwardly from its periphery along said shoulder.

3. A fluid flow control device for maintaining a substantially uniform fluid delivery rate over a wide range of pressure variations comprising a casing having a relatively large diameter inlet, a reduced diameter outlet in axial alignment with said inlet, and a shoulder at the junction of said inlet and said outlet having a flat relatively wide annular bearing area, a resilient flow control disk mounted in said inlet for engagement with the wall thereof adjacent the periphery thereof and seating against said shoulder by the pressure of fluid acting thereon, said flow control disk having a flat face on its upstream side and having a recessed face on its downstream side engaging said shoulder adjacent the outer margin thereof and converging inwardly to a central inverted cone-like projection, the diameter of the base of which is smaller than the diameter of said outlet, said disk also having a plurality of axial passageways opening to the periphery thereof and having radial flow restricting passageways leading therefrom along the recessed face of said disk, said flow restricting passageways being generally V-shaped in cross-section and opening toward said shoulder and decreasing in cross-sectional area from the periphery toward the center of said disk and progressively decreasing the flow area upon the deformation of the recessed face of said disk from the periphery toward said outlet inwardly along said shoulder, and said projection directing fluid from said flow restricting passageways to said outlet and reducing noise generation.

4. A fluid flow control device for maintaining a substantially uniform fluid delivery rate over a wide range of pressure variations comprising a casing having a passageway leading therethrough having a flat shoulder facing the upstream side of said passageway, the inner margin of which shoulder defines an outlet orifice, a resilient flow control disk seated on said shoulder and so constructed and arranged as to accommodate the passage of fluid along its edge, said flow control disk having a concave face on the downstream side thereof uniformly receding inwardly toward the center of said disk and having a flow restriction passageway leading from the edge of said disk toward the center thereof and intersecting the concave face of said disk, the cross-sectional area of said flow restriction passageway decreasing from the edge toward the center of said disk and providing a progressively reducing flow area upon deformation of said disk inwardly toward said shoulder upon increases in pressure.

5. A fluid flow control device for maintaining a substantially uniform delivery rate over a wide range of pressure variations comprising a casing having a passageway leading therethrough, a shoulder in said passageway facing the upstream side thereof, the inner margin of which defines an outlet passage, a resilient disk in said passageway and seating against said shoulder and having a peripheral wall spaced inwardly of the margin of said passageway, said disk having a recessed downstream face of a concave form converging inwardly to a central cone-like projection and having a flow restricting passageway leading along the concave face of said disk to said cone-like projection, the cross-sectional area of which flow restricting passageway decreases toward the center of said disk, the concave face of said disk deforming radially inwardly along said shoulder upon increases in pressure on the upstream face of said disk and thereby progressively decreasing the flow area of said flow restricting passageway upon increases in pressure on the upstream face of said disk, and said cone-like projection directing fluid from said flow restricting passageway to said outlet and reducing noise generation.

References Cited in the file of this patent

UNITED STATES PATENTS

| | | |
|---|---|---|
| 2,342,890 | Poulter | Feb. 29, 1944 |
| 2,460,647 | Miller | Feb. 1, 1949 |
| 2,508,793 | Miller | May 23, 1950 |
| 2,728,355 | Dahl | Dec. 27, 1955 |
| 2,853,264 | Lodge | Sept. 23, 1958 |